(12) United States Patent
Lee et al.

(10) Patent No.: US 10,479,218 B2
(45) Date of Patent: Nov. 19, 2019

(54) ELECTRIC VEHICLE POWER SYSTEM WITH SHARED CONVERTER

(71) Applicant: Toyota Motor Engineering & Manufacturing North America, Inc., Erlanger, KY (US)

(72) Inventors: Jae Seung Lee, Ann Arbor, MI (US); Jongwon Shin, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 356 days.

(21) Appl. No.: 15/432,845

(22) Filed: Feb. 14, 2017

(65) Prior Publication Data
US 2018/0229618 A1    Aug. 16, 2018

(51) Int. Cl.
*B60L 50/13*      (2019.01)
*B60L 53/22*      (2019.01)
(Continued)

(52) U.S. Cl.
CPC ............. *B60L 50/13* (2019.02); *B60L 15/007* (2013.01); *B60L 53/14* (2019.02); *B60L 53/22* (2019.02);
(Continued)

(58) Field of Classification Search
None
See application file for complete search history.

(56) References Cited

U.S. PATENT DOCUMENTS

| 6,474,856 B2 | 11/2002 | Billot |
| 8,053,923 B2 | 11/2011 | Tateishi et al. |

(Continued)

FOREIGN PATENT DOCUMENTS

| JP | 11-262195 | 9/2011 |
| JP | 2013-27140 | 2/2013 |
| WO | WO 1999/028157 | 6/1999 |

OTHER PUBLICATIONS

Kim et al. "A Single-Inductor Eight-Channel Output DC-DC Converter with Time-Limited Power Distribution Control and Single Shared Hysteresis Comparator" IEEE Transactions on Circuits and Systems vol. 60, No. 12, pp. 3354-3367, Dec. 2013.

*Primary Examiner* — Jared Fureman
*Assistant Examiner* — James P Evans
(74) *Attorney, Agent, or Firm* — Snell & Wilmer LLP

(57) ABSTRACT

Methods, systems, and apparatus for an electric vehicle. The system includes a battery control unit configured to be in a grid-connected mode or a stand-alone mode. The system includes a shared boost converter connected to a battery. The shared boost converter receives alternating current (AC) power, steps up voltage and converts the AC power to direct current (DC) power when the battery control unit is in the grid-connected mode. The shared boost converter receives DC power from the battery and steps up voltage when the battery control unit is in the stand-alone mode. The system also includes an inverter configured to receive the stepped up DC power when the battery control unit is in the stand-alone mode and convert the DC power to AC power. The system also includes a motor/generator connected to the inverter and configured to receive AC power for powering a drivetrain of the electric vehicle.

18 Claims, 6 Drawing Sheets

(51) Int. Cl.
   *B60L 53/24*   (2019.01)
   *B60L 55/00*   (2019.01)
   *B60L 15/00*   (2006.01)
   *B60L 53/14*   (2019.01)
   *B60L 58/12*   (2019.01)

(52) U.S. Cl.
   CPC .............. *B60L 53/24* (2019.02); *B60L 55/00* (2019.02); *B60L 58/12* (2019.02); *B60L 2210/10* (2013.01); *B60L 2210/30* (2013.01); *B60L 2210/40* (2013.01); *H02P 2201/09* (2013.01); *Y02E 60/721* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | |
|---|---|---|
| 8,453,814 B2 | 6/2013 | Gambach et al. |
| 8,970,112 B2 | 3/2015 | Baier et al. |
| 9,199,550 B2 | 12/2015 | Katano et al. |
| 9,310,411 B2 | 4/2016 | Mehringer et al. |
| 9,421,867 B2 | 8/2016 | Sakurai et al. |
| 9,487,090 B2 | 11/2016 | Zhang et al. |
| 2004/0062059 A1* | 4/2004 | Cheng ..................... B60L 53/22 363/17 |
| 2005/0279242 A1* | 12/2005 | Maier ....................... B60L 7/04 105/26.05 |
| 2005/0284673 A1 | 12/2005 | Nakazawa et al. |
| 2009/0067205 A1* | 3/2009 | Oyobe ................... B60K 6/445 363/98 |
| 2009/0103341 A1* | 4/2009 | Lee ......................... B60W 10/26 363/124 |
| 2010/0133900 A1* | 6/2010 | King ...................... B60L 58/20 307/9.1 |
| 2010/0237694 A1* | 9/2010 | Fuma .................... B60L 15/007 307/9.1 |
| 2012/0112702 A1* | 5/2012 | Steigerwald .......... B60L 3/0069 320/137 |
| 2013/0038273 A1* | 2/2013 | Riggio ..................... H02J 7/00 320/107 |
| 2013/0141070 A1 | 6/2013 | Goessling et al. |
| 2014/0321659 A1 | 10/2014 | Buganza et al. |
| 2014/0354195 A1* | 12/2014 | Li .......................... H02J 7/0036 318/139 |
| 2015/0061569 A1* | 3/2015 | Alexander .......... B60L 11/1809 320/101 |
| 2015/0200613 A1 | 7/2015 | Ota et al. |
| 2016/0016479 A1* | 1/2016 | Khaligh .............. B60L 11/1812 363/17 |
| 2016/0082946 A1* | 3/2016 | Kodawara ............... B60L 55/00 701/22 |
| 2016/0207403 A1 | 7/2016 | Iida et al. |
| 2016/0268917 A1* | 9/2016 | Ramsay ................ H02M 5/458 |
| 2017/0267115 A1* | 9/2017 | Unno ................. B60L 11/1842 |
| 2017/0305278 A1* | 10/2017 | Geyer ..................... H02M 1/10 |
| 2018/0037121 A1* | 2/2018 | Narla ..................... B60L 53/53 |
| 2018/0072164 A1* | 3/2018 | Plesniak ................. B60L 53/00 |

* cited by examiner

ELECTRIC VEHICLE POWER SYSTEM WITH SHARED CONVERTER

BACKGROUND

1. Field

This specification relates to a system and a method for storing and providing power for an electric vehicle.

2. Description of the Related Art

Electric vehicles may store and use power. Fully electric vehicles may receive power from an electrical outlet and store the power in a battery. Hybrid vehicles may generate electricity from regenerative braking and may store the generated power in a battery. The battery may be used to power a motor, which is used to propel the vehicle.

Conventional power management systems may include various distributed and fragmented elements and sub-systems. These conventional systems may distribute duties and responsibilities within the system to various disparate elements and sub-systems. A drawback of these conventional systems has been that they occupy more space than necessary, adding weight, inefficiency, and additional opportunities for malfunctioning or failing of equipment. Thus, there is a need for a method and a system directed to more efficiently, effectively, and compactly storing and using power.

SUMMARY

What is described is a system for an electric vehicle in a grid-connected mode or in a stand-alone mode. The system includes a battery control unit configured to be in the grid-connected mode or the stand-alone mode based on operation of the electric vehicle. The system also includes a shared boost converter connected to a battery. The shared boost converter is configured to receive power from an alternating current (AC) power source, step up voltage and convert the received AC power to direct current (DC) power, and output converted and stepped up DC power for storage in the battery when the battery control unit is in the grid-connected mode. The shared boost converter is also configured to receive DC power from the battery, step up voltage of the received DC power, and output stepped up DC power when the battery control unit is in the stand-alone mode. The system also includes an inverter connected to the shared boost converter and configured to receive the stepped up DC power from the shared boost converter when the battery control unit is in the stand-alone mode, convert the received stepped up DC power to AC power, and output converted AC power. The system also includes a motor/generator connected to the inverter and configured to receive the converted AC power for powering a drivetrain of the electric vehicle.

Also described is a system for an electric vehicle. The system includes a battery control unit configured to be in a grid-connected mode or a stand-alone mode based on operation of the electric vehicle. The system also includes a shared boost converter connected to a battery. The shared boost converter is configured to facilitate charging of the battery when the battery control unit is in the grid-connected mode by receiving power from an alternating current (AC) power source, stepping up voltage and converting the received AC power to direct current (DC) power, and outputting converted and stepped up DC power for storage in the battery. The shared boost converter is also configured to facilitate charging of the battery when the battery control unit is in the stand-alone mode by receiving generated DC power, stepping down voltage of the generated DC power, and outputting the stepped down DC power for storage in the battery. The shared boost converter is also configured to facilitate discharging of the battery when the battery control unit is in the grid-connected mode by receiving stored DC power from the battery, stepping down voltage and converting the received stored DC power into AC power, and outputting the stepped down and converted AC power for providing to the AC power source. The shared boost converter is also configured to facilitate discharging of the battery when the battery control unit is in the stand-alone mode by receiving DC power from the battery, stepping up voltage of the received DC power, and outputting stepped up DC power for powering a motor/generator of the electric vehicle.

Also described is an electric vehicle. The electric vehicle is connected to an AC power source in a grid-connected mode and disconnected from the AC power source in a stand-alone mode. The electric vehicle includes a battery control unit configured to be in the grid-connected mode or the stand-alone mode. The electric vehicle includes a shared boost converter. The shared boost converter is configured to step up voltage or step down voltage, and convert AC power to DC power or convert DC power to AC power when the battery control unit is in the grid-connected mode. The shared boost converter is also configured to step up voltage or step down voltage when the battery control unit is in the stand-alone mode. The electric vehicle also includes an inverter connected to the shared boost converter and configured to convert AC power to DC power or convert DC power to AC power when the battery control unit is in the stand-alone mode. The electric vehicle also includes a motor/generator connected to the inverter and configured to receive AC power from the battery via the inverter for powering a drivetrain of the electric vehicle or generate AC power for charging the battery.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
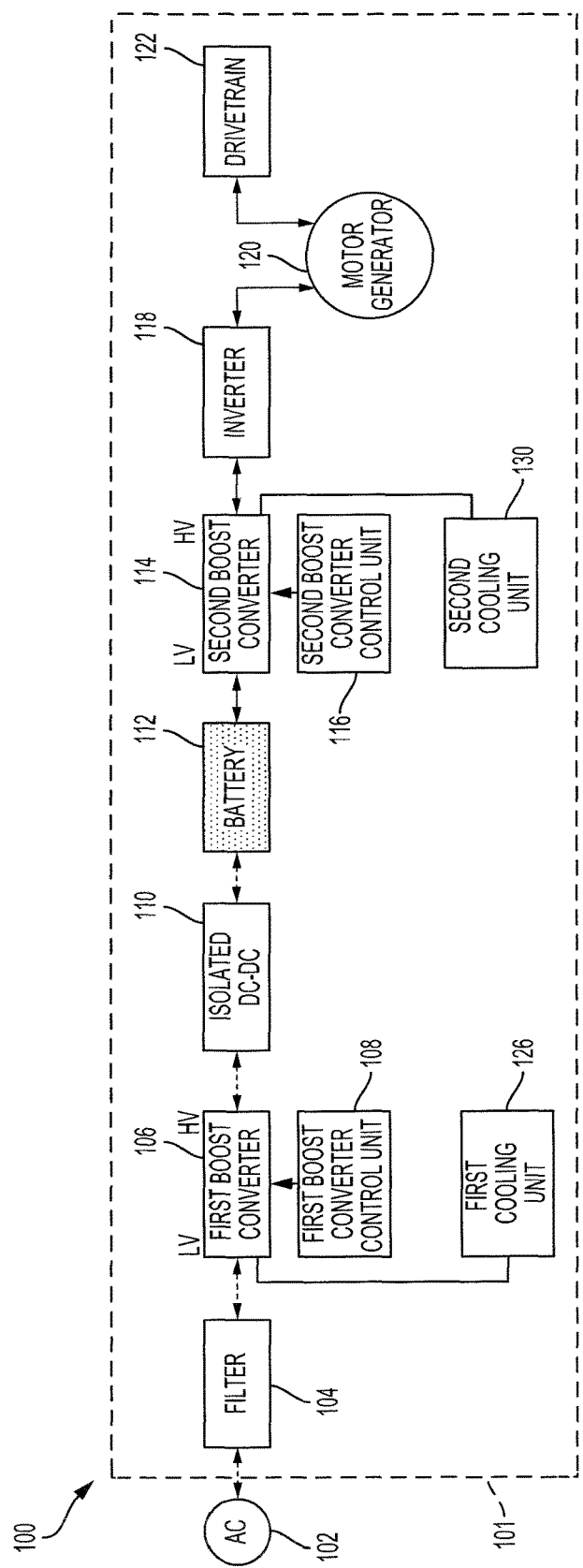
FIG. 1 is a block diagram of an example power conversion system using two separate boost converters, according to an aspect of the invention.

Disclosed herein are systems, vehicles and methods for charging and discharging a battery of an electric vehicle in a grid-connected mode or in a stand-alone mode. Power conversion systems for electric vehicles may operate in one of two modes, a grid-connected mode or a stand-alone mode. When in the grid-connected mode, the electric vehicle may be stationary and connected to a power source. In the grid-connected mode, the electric vehicle may receive power from the power source, such as an electrical outlet, and store the power in a battery. In the grid-connected mode, the electric vehicle may also provide excess power stored in the battery to the power source.

When in the stand-alone mode, the electric vehicle may not be connected to the power source and may be turned on or in an operational state. In the stand-alone mode, the power stored in the battery may be used to power the electric vehicle, including a motor/generator for propelling the electric vehicle, or to power any other electrical system of the electric vehicle. In the stand-alone mode, any generated energy may be stored in the battery. For example, if the electric vehicle is capable of regenerative braking, the generated energy may be stored in the battery.

Some power conversion systems may include multiple boost converters. For example, a power conversion system may include two boost converters—one to be used when the electric vehicle is in the grid-connected mode, and another to be used when the electric vehicle is in the stand-alone mode. The two boost converters may have different functionalities in the different contexts. However, having two boost converters (and the associated components to operate both boost converters) may occupy more space than necessary in the electric vehicle. Being able to remove common elements may result in increased energy efficiency and increased performance, among other benefits.

An exemplary system includes a battery control unit configured to be in the grid-connected mode or the stand-alone mode based on operation of the electric vehicle. The system also includes a shared boost converter connected to a battery. The shared boost converter is configured to receive power from an alternating current (AC) power source, step up voltage and convert the received AC power to direct current (DC) power, and output converted and stepped up DC power for storage in the battery when the battery control unit is in the grid-connected mode. The shared boost converter is also configured to receive DC power from the battery, step up voltage of the received DC power, and output stepped up DC power when the battery control unit is in the stand-alone mode. The system also includes an inverter connected to the shared boost converter and configured to receive the stepped up DC power from the shared boost converter when the battery control unit is in the stand-alone mode, convert the received stepped up DC power to AC power, and output converted AC power. The system also includes a motor/generator connected to the inverter and configured to receive the converted AC power for powering a drivetrain of the electric vehicle.

The systems described herein provide benefits and advantages such as allowing multiple redundant units, elements, or components of a power conversion system of an electric vehicle to be combined. The combining of the multiple redundant components creates a savings in terms of reduced cost to manufacture the electric vehicle, a weight savings, and a savings in space occupied by the system. The savings from reducing the weight may result in increased fuel and/or energy efficiency, and may result in increased performance and reliability. The savings from the decreased space occupied by the system may result in increased cabin space for passengers of the electric vehicle. In addition, as will be described herein, efficiency gains may also be realized from using a single, more efficient cooling system instead of multiple cooling systems.

FIG. 1 is a block diagram of an example power conversion system 100 using two separate boost converters. The power conversion system 100 includes an AC power source 102 and an electric vehicle 101 having a filter 104, a first boost converter 106, a first boost converter control unit 108, an isolated DC-DC converter 110, a battery 112, a second boost converter 114, a second boost converter control unit 116, an inverter 118, a motor/generator 120, and a drivetrain 122. The electric vehicle 101 may be any fully electrically powered or partially electrically powered transportation apparatus, such as an electric car, an electric helicopter, an electric airplane, an electric unmanned aerial vehicle, an electric scooter, an electric self-balancing scooter, an electric wheelchair, or the like. The electric vehicle 101 may be manned or unmanned.

While the AC power source 102 is connected to the electric vehicle 101, the electric vehicle 101 may be in a grid-connected mode. In the grid-connected mode, the electric vehicle 101 may receive electricity from the AC power source 102 for storage in battery 112, or may provide energy to the AC power source 102 from the battery 112. In some embodiments, excess energy stored in the battery 112 may be sold back to the AC power source 102 or stored in the AC power source 102. In some embodiments, when power is sold back to the AC power source 102, the flow of power from the battery to the AC power source 102 may be referred to as vehicle-to-grid, and the energy may be sold to a utility company.

The AC power source 102 may be any AC power source, such as an electrical outlet, and is connected to a filter 104 of the electric vehicle 101. The AC power received from the AC power source 102 may be provided by a power grid, and may be single-phase AC voltage or three-phase AC voltage. The AC power received from the AC power source 102 may be unsuitable for direct use to charge the battery 112, and filtering and converting may be performed on the AC power.

The filter 104 is connected to the AC power source 102 and may include common-mode and differential-mode filters to comply with electromagnetic interference (EMI) requirements or electromagnetic compatibility (EMC) requirements. It may also include a rectifier bridge.

The first boost converter 106 is connected to the filter 104. The first boost converter 106 is controlled by a first boost converter control unit 108. The first boost converter control unit 108 provides the control algorithms to the first boost converter 106 for adjusting the power factor and total harmonic distortion of received AC current, while stepping up (or increasing) voltage or stepping down (or decreasing) voltage.

The isolated DC-DC converter 110 converts received DC power into refined DC power. By refining the received DC power, the isolated DC-DC converter 110 filters out ripples and other noise in the received DC power. In some embodiments, the DC-DC converter 110 is a dual active bridge DC-DC converter.

The battery 112 receives DC power and transmits DC power.

The second boost converter 114 receives DC power and steps up the received DC power to a higher voltage. The second boost converter 114 is controlled by a second boost converter control unit 116. The second boost converter control unit 116 provides the control algorithms to the second boost converter 114 for the second boost converter 114 to step-up voltage or step-down voltage of the DC power.

The inverter 118 converts DC power to AC power or converts AC power to DC power. The motor/generator 120 drives the drivetrain 122 of the electric vehicle 101, propelling the electric vehicle 101. As described herein, the electric vehicle may be an electric car, an electric helicopter, an electric scooter, an electric self-balancing scooter, an electric wheelchair, or the like.

When the electric vehicle 101 is connected to the AC power source 102 or any power source, it may be in a grid-connected state, and electricity may flow from the AC power source 102 to the battery 112 (when the electric vehicle 101 is charging) or electricity may flow from the battery 112 to the AC power source 102 (when the electric vehicle 101 is discharging). The grid-connected state is shown in FIG. 1 by the dashed lines connecting the AC power source 102, the first boost converter 106, the isolated DC-DC converter 110, and the battery 112.

In the grid-connected state, when the battery 112 is charging, the filter 104 receives AC power and outputs filtered and rectified AC power. The first boost converter 106 receives AC power and outputs stepped-up DC power. In some embodiments, when filtering and rectifying are not necessary, the first boost converter 106 receives AC power from the AC power source 102 directly. The isolated DC-DC converter 110 converts stepped-up DC power into stepped-up and refined DC power. The battery 112 receives the refined and stepped-up DC power, and stores the DC power.

In the grid-connected state, when the battery 112 is discharging, the isolated DC-DC converter 110 receives DC power from the battery 112. The isolated DC-DC converter 110 converts the received DC power into refined DC power. The first boost converter 106 receives the refined DC power and steps down the refined DC power. The filter receives and filters the refined and stepped-down DC power and transmits it to the AC power source 102.

When the electric vehicle 101 is in a stand-alone state (e.g., not the grid-connected state), the battery 112 may provide power to an electrically powered component or may receive power from the electrically powered component. For example, the electrically powered component may be a motor/generator 120, and in the stand-alone state, the battery 112 may provide power to the motor/generator 120 to power the drivetrain 122 to propel the electric vehicle 101. The motor/generator 120 may also charge the battery 112 using regenerative braking.

Vehicles having regenerative braking capabilities are able to generate electricity when braking. The electric vehicle 101 may be coasting or braking and motor/generator 120 is not propelling the electric vehicle 101. When the wheels of the electric vehicle 101 turn in these situations, electricity is generated by the motor/generator 120 from the turning of the axles connected to the wheels. The generated electricity is stored in the battery 112. In generating the electricity from the turning of the wheels, the regenerative braking provides resistance to the axles of the electric vehicle 101, resulting in a slowing down of the electric vehicle 101.

The stand-alone state is shown in FIG. 1 by the solid lines connecting the battery 112 to the second boost converter 114 to the inverter 118 to the motor/generator 120, to the drivetrain 122. When the battery 112 is discharging, the battery 112 provides DC power to the second boost converter 114. The second boost converter 114 receives the DC power and steps up the received DC power to a higher voltage. The stepped-up DC power is output to the inverter 118.

The inverter 118 is connected to the second boost converter 114 and converts the stepped-up DC power to AC power. The inverter 118 is also connected to the motor/generator 120, and provides the AC power to the motor/generator 120.

In the stand-alone state, when the battery 112 is charging, the drivetrain 122 powers the motor/generator 120, which provides AC power to the inverter 118. The inverter 118 converts the AC power to DC power and provides DC power to the second boost converter 114. The second boost converter 114 steps down the received DC power and the stepped-down DC power is stored in the battery 112.

The first boost converter 106 may be connected to a first cooling unit 126. The first cooling unit 126 may include a liquid-cooled cold plate, air-cooled heat sink, and/or a cooling fan for cooling the first boost converter 106.

The second boost converter 114 may be connected to a second cooling unit 130. The second cooling unit 130 may include a liquid-cooled cold plate, air-cooled heat sink, and/or a cooling fan for cooling the second boost converter 114.

The power conversion system's 100 inclusion of two boost converters (first boost converter 106 and second boost converter 114) results in the inclusion of associated components to support each boost converter, such as dual cooling systems (e.g., first cooling unit 126 and second cooling unit 130). Combining these two boost converters 106 and 114 may provide a savings in cost, volume, and weight of the vehicle by reducing the number of components and cooling units used in the system. This savings in weight may increase efficiency and performance (e.g., increased gravimetric or volumetric power density). The savings in volume may increase the passengers' room inside the passenger cabin of the vehicle and increase the passengers' convenience.

Figure 2A:
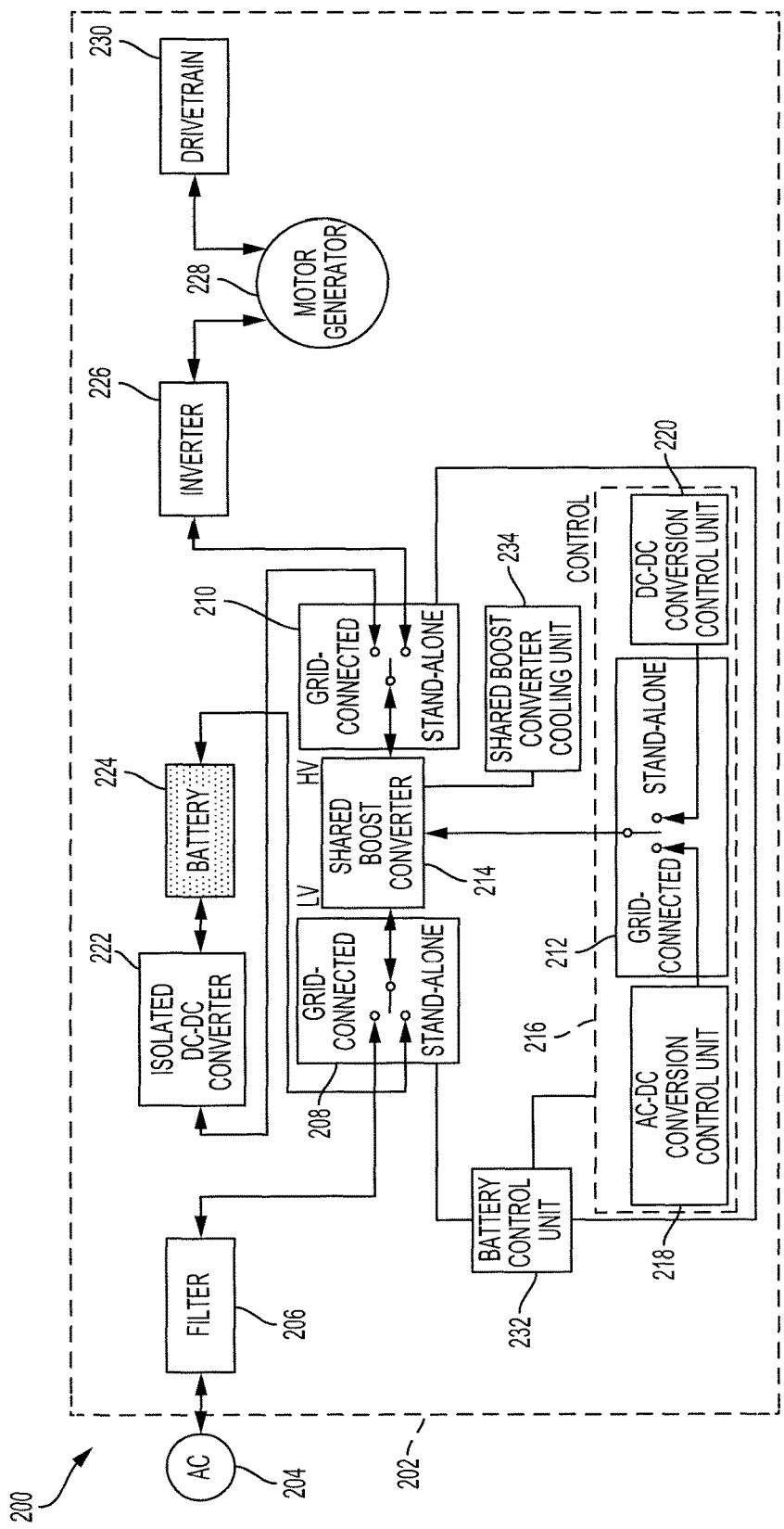
FIG. 2A is a block diagram of an example power conversion system using a single shared boost converter, according to an aspect of the invention.

FIG. 2A is a block diagram of an example power conversion system 200 using a single shared boost converter, according to an aspect of the invention.

The power conversion system 200 includes an AC power source 204 and an electric vehicle 202, which includes a filter 206, a first switch 208, a second switch 210, a third switch 212, a shared boost converter 214, a shared boost converter control unit 216, an isolated DC-DC converter 222, a battery 224, an inverter 226, a motor/generator 228, a drivetrain 230, and a battery control unit 232.

The battery control unit 232 may be one or more battery control units implemented as a single battery control unit or in multiple battery control units. The battery control unit 232 may include one or more processors or controllers specifically designed for controlling one or more power and/or battery related functions, as described herein. The battery control unit 232 may also include a non-transitory memory storing instructions to be executed by the one or more processors of the battery control unit 232.

The battery control unit 232 may be in a grid-connected mode or a stand-alone mode. The battery control unit 232 is connected to each of the first switch 208, second switch 210, and the third switch 212. The first switch 208, second switch 210, and the third switch 212 are each configured to be set to a first state corresponding to the grid-connected mode (grid-connected state) or a second state corresponding to the stand-alone mode (stand-alone state). The battery control unit 232 may instruct the first switch 208, second switch 210, and the third switch 212 to transition to and from their respective grid-connected states and their respective stand-alone states. Each of the first switch 208, second switch 210, and the third switch 212 may be single-pole double-throw switches.

Figure 2B:
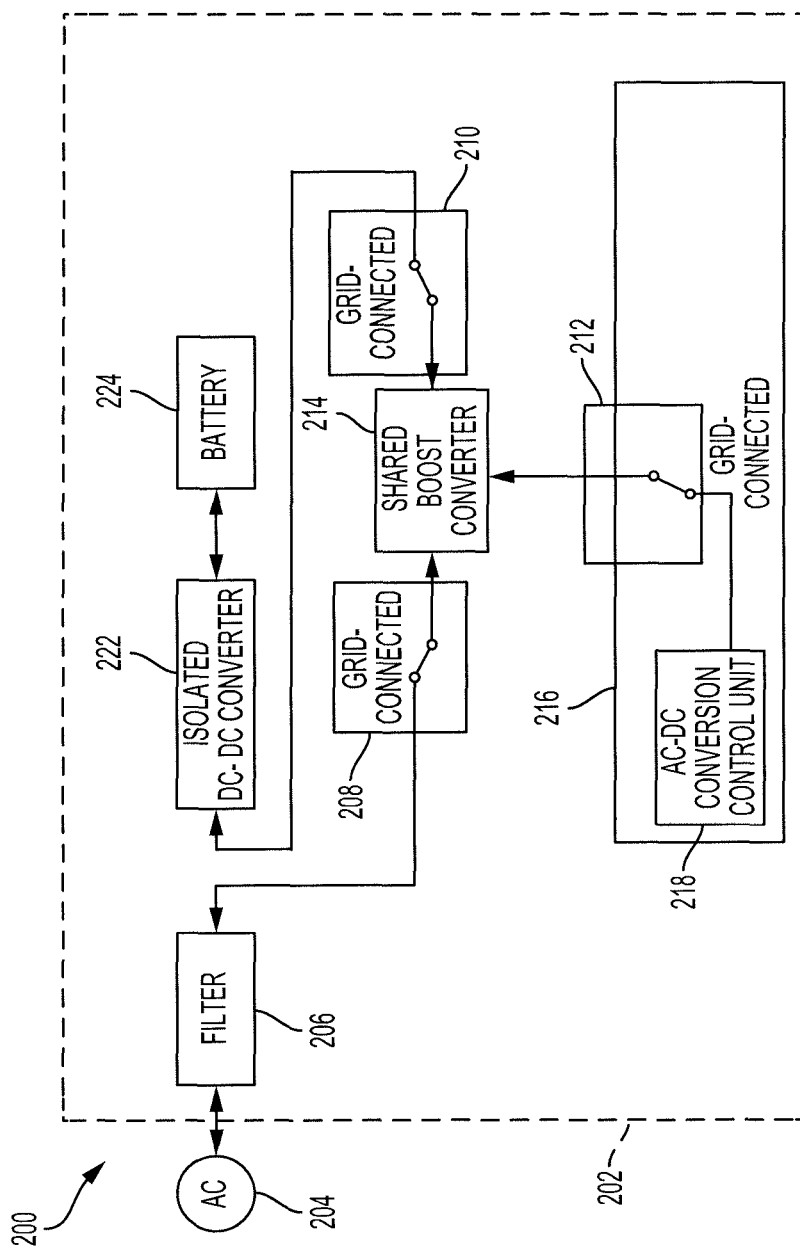
FIG. 2B is a block diagram of the example power conversion system of FIG. 2A when the battery control unit is in the grid-connected mode, according to an aspect of the invention.

When the battery control unit 232 is in the grid-connected mode, the first switch 208, the second switch 210, and the third switch 212 may be set to a grid-connected state and the energy flow described herein and illustrated in FIG. 2B is performed.

Figure 2C:
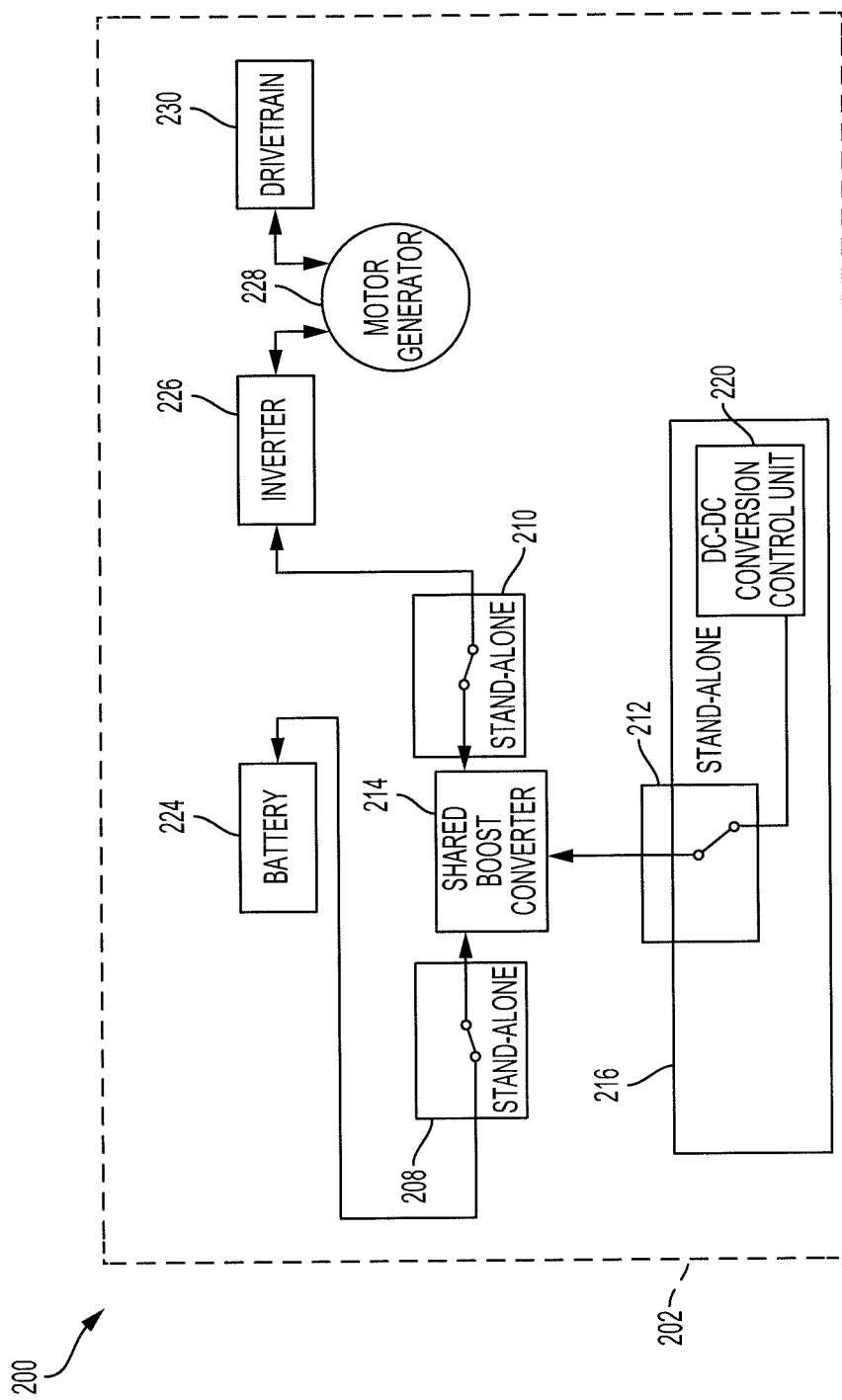
FIG. 2C is a block diagram of the example power conversion system of FIG. 2A when the battery control unit is in the stand-alone mode, according to an aspect of the invention.

When the battery control unit 232 is in stand-alone mode, the first switch 208, the second switch 210, and the third switch 212 may be set to a stand-alone state and the energy flow described herein and illustrated in FIG. 2C is performed.

The battery control unit 232 may not be in a grid-connected mode and a stand-alone mode at the same time. That is, the grid-connected mode and the stand-alone mode may be mutually exclusive states of the battery control unit 232. The battery control unit 232 may be directly or indirectly connected to various components of the electric vehicle 202, such as an engine, motor/generator 120, or transmission, for example. The battery control unit 232 may be configured to be in the grid-connected mode or stand-alone mode based on operation or status of the electric vehicle 202. In some embodiments, the battery control unit 232 automatically determines whether to be in the grid-connected mode or the stand-alone mode. In some embodiments, the battery control unit 232 may be manually set to the grid-connected or stand-alone mode by a driver or other individual interacting with the electric vehicle 202.

The battery control unit 232 may be in the grid-connected mode or stand-alone mode based on whether the AC power source 204 is connected to the electric vehicle 202. In some embodiments, when the AC power source 204 is connected to the electric vehicle 202, the battery control unit 232 is in the grid-connected mode, and when the AC power source 204 is not connected to the electric vehicle 202, the battery control unit 232 is in the stand-alone mode.

The battery control unit 232 may be in the grid-connected mode or stand-alone mode based on an operational state of the electric vehicle 202. In some embodiments, when the electric vehicle 202 is turned on, the battery control unit 232 is in the stand-alone mode, and/or when the electric vehicle 202 is turned off, the battery control unit 232 is in the grid-connected mode. In some embodiments, when a transmission of the electric vehicle 202 is set to park, the battery control unit 232 is in the grid-connected mode. In some embodiments, when the transmission of the electric vehicle 202 is set to drive, the battery control unit 232 is in the stand-alone mode.

If the electric vehicle 202 is turned on and then connected to the AC power source 204, the electric vehicle 202 may automatically turn off so that the battery control unit 232 is not in the grid-connected mode and the stand-alone mode at the same time. Alternatively, when the electric vehicle 202 is engaged with the AC power source 204 and the electric vehicle 202 is not turned off, the electric vehicle 202 may not receive any power from the AC power source 204 until the electric vehicle 202 is turned off. In some embodiments, when the electric vehicle 202 is not turned on and is also not connected to the AC power source 204, the battery control unit 232 defaults to the grid-connected mode. In some embodiments, when the electric vehicle 202 is not turned on and is also not connected to the AC power source 204, the battery control unit 232 defaults to the stand-alone mode.

The AC power source 204 is used to charge the electric vehicle 202, which may be any fully electrically powered or partially electrically powered transportation apparatus, such as an electric car, an electric helicopter, an electric airplane, an electric unmanned aerial vehicle, an electric scooter, an electric self-balancing scooter, an electric wheelchair, or the like. The electric vehicle 202 may be manned or unmanned.

In the grid-connected mode, the electric vehicle 202 may receive electricity from the AC power source 204 for storage in battery 224, or may provide energy to the AC power source 204 from the battery 224. In some embodiments, excess energy stored in the battery 224 may be sold back to the AC power source 204 or stored in the AC power source 204.

The AC power source 204 may be any AC power source, such as an electrical outlet, and is connected to a filter 206 of the electric vehicle 202. The AC power received from the AC power source 204 may be provided by a power grid, and may be single-phase AC voltage or three-phase AC voltage. The AC power source 204 may be removably coupled to the electric vehicle 202 via a plug or connector. The plug or connector used to connect the AC power source 204 to the electric vehicle 202 may be a wired or static wireless power transfer system.

The system 200 in the grid-connected mode is illustrated in FIG. 2B. The filter 206 is connected to the AC power source 204 and may include common-mode and differential-mode filters to comply with electromagnetic interference (EMI) requirements or electromagnetic compatibility (EMC) requirements. It may also include a rectifier bridge. The rectifier bridge may be configured by diodes or switches.

The filter 206 is connected to the first switch 208, which is in the grid-connected state. The first switch 208 connects the filter 206 to the shared boost converter 214.

The shared boost converter 214 is controlled by the shared boost converter control unit 216. The shared boost converter control unit 216 provides the control algorithms to the shared boost converter 214 based on whether the electric vehicle 202 is in grid-connected mode or stand-alone mode. The shared boost converter control unit 216 is connected to the battery control unit 232, which is configured to communicate to the shared boost converter control unit 216 whether the battery control unit 232 is in grid-connected mode or stand-alone mode.

When the battery control unit 232 is in grid-connected mode, the third switch 212 is set to the grid-connected state, and shared boost converter control unit 216 uses the AC-DC conversion control unit 218 to adjust the power factor of the received AC current and total harmonic distortion of received AC current, while stepping up (or increasing) voltage or stepping down (or decreasing) voltage.

The shared boost converter control unit 216 may be implemented as one or more processors and the AC-DC conversion control unit 218 and the DC-DC conversion control unit 220 may be implemented as software instructions stored on memory. The shared boost converter control unit 216 may be implemented as a hardware chip and the AC-DC conversion control unit 218 and the DC-DC conversion control unit 220 may be implemented as circuits on the hardware chip. In some embodiments, when filtering and rectifying are not necessary, the shared boost converter 214 is connected to the AC power source 204 directly.

The second switch 210 is set to the grid-connected mode state and connects the shared boost converter 214 to the isolated DC-DC converter 222. The isolated DC-DC converter 222 converts received DC power into refined DC power. By refining the received DC power, the isolated DC-DC converter 222 filters out ripples and other noise in the received DC power. In some embodiments, the DC-DC converter 222 is a dual active bridge DC-DC converter.

The battery 224 receives DC power and transmits DC power. The inverter 226 converts DC power to AC power or converts AC power to DC power. The motor/generator 228 drives the drivetrain 230 of the electric vehicle 202, propelling the electric vehicle 202.

As shown in FIG. 2B, when the electric vehicle 202 is connected to the AC power source 204 or any power source, it may be in a grid-connected state, and electricity may flow from the AC power source 204 to the battery 224 (when the electric vehicle 202 is charging) or electricity may flow from the battery 224 to the AC power source 204 (when the electric vehicle 202 is discharging).

In the grid-connected state, when the battery 224 is charging, the filter 206 receives AC power and outputs filtered and rectified AC power. The shared boost converter 214 receives AC power (via the first switch 208) and outputs stepped-up DC power to the isolated DC-DC converter 222 (via the second switch 210). The isolated DC-DC converter 222 converts stepped-up DC power into stepped-up and refined DC power. The battery 224 receives the refined and stepped-up DC power, and stores the DC power.

In the grid-connected state, when the battery 224 is discharging, the isolated DC-DC converter 222 receives DC power from the battery 224. The isolated DC-DC converter 222 converts the received DC power into refined DC power. The shared boost converter 214 receives the refined DC power (via the second switch 210) and steps down the refined DC power. The filter 206 receives (via the first switch 208) and filters the refined and stepped-down DC power and transmits it to the AC power source 204. In some embodiments, the filter 206 and/or the isolated DC-DC converter 222 may not be necessary and removed from the system 200.

When the electric vehicle 202 is in a stand-alone state (e.g., not the grid-connected state), the battery 224 may provide power to an electrically powered component or may receive power from the electrically powered component. For example, the electrically powered component may be a motor/generator 228, and in the stand-alone state, the battery 224 may provide power to the motor/generator 228 to power the drivetrain 122 to propel the electric vehicle 202. The motor/generator 228 may also charge the battery 224 using regenerative braking.

When the battery control unit 232 is in the stand-alone mode, the first switch 208, second switch 210, and the third switch 212 may be set to the stand-alone state, as shown in FIGS. 2A and 2C.

When the battery control unit 232 is in the stand-alone state and battery 224 is discharging, the battery 224 provides DC power to the shared boost converter 214 via the first switch 208. The shared boost converter 214 receives the DC power and steps up the received DC power to a higher voltage. The stepped-up DC power is output, via the second switch 210 to the inverter 226. The inverter 226 is connected to the shared boost converter 226 and converts the stepped-up DC power to AC power. The inverter 226 is also connected to the motor/generator 228, and provides the AC power to the motor/generator 228.

When the battery control unit 232 is in the stand-alone state and the battery 224 is charging, the drivetrain 122 powers the motor/generator 228, which provides AC power to the inverter 226. The inverter 226 converts the AC power to DC power and provides DC power to the shared boost converter 214, via second switch 210. The shared boost converter 214 steps down the received DC power and the stepped-down DC power is transmitted to the battery 224 via first switch 208 and stored in the battery 224.

Referring back to FIG. 2A, the shared boost converter 214 is connected to a shared boost converter cooling unit 234. By using a shared boost converter, the system 200 is able to also reduce the number of cooling units, as compared to system 100. In addition, the first cooling unit 126 may be less efficient than the second cooling unit 130 or the shared boost converter cooling unit 234. By using the more efficient cooling unit (e.g., shared boost converter cooling unit 234) during the grid-connected mode instead of a less efficient first cooling unit 126, charging efficiency may be improved.

In some situations, the responsibilities and/or the specifications of the first boost converter 106 and second boost converter 114 may not be identical. The shared boost converter 214 used to combine the two boost converters (e.g., first boost converter 106 and second boost converter 114) may be designed to accommodate both situations. For example, the voltage rating of the first boost converter 106 may be 600V and the voltage rating of the second boost converter 114 may be 1.2 kV. The shared boost converter 214 may be designed for the higher of the voltage ratings—1.2 kV.

Figure 3:
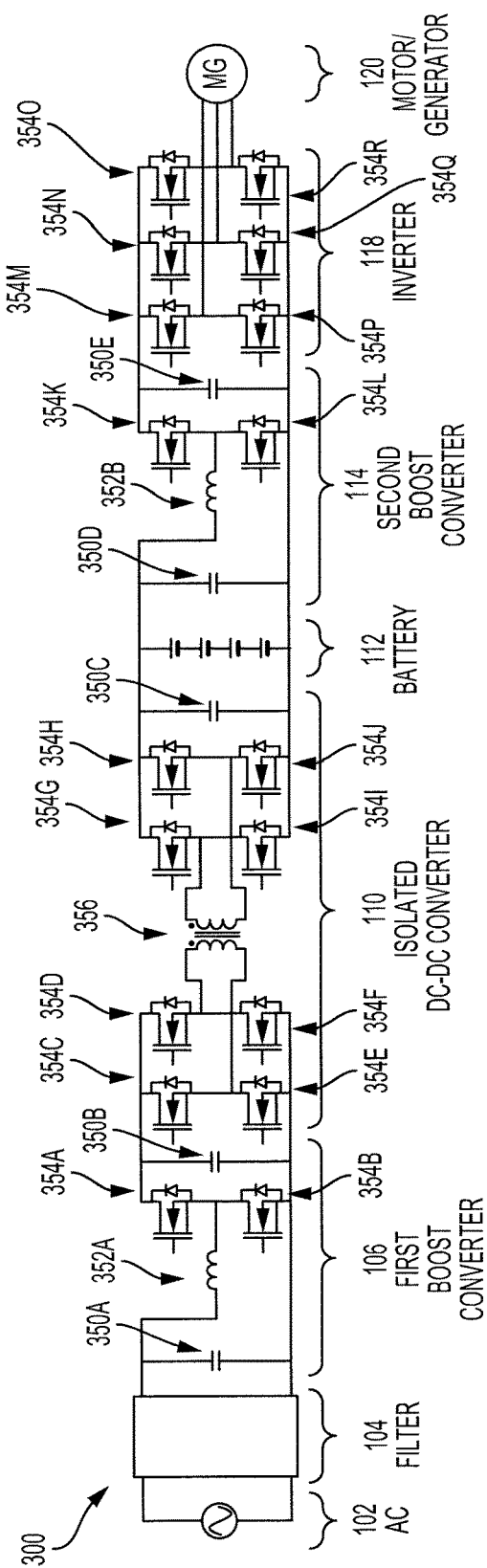
FIG. 3 is a circuit diagram of the example power conversion system of FIG. 1, using two separate boost converters, according to an aspect of the invention.

FIG. 3 is a circuit diagram of the example power conversion system of FIG. 1, using two separate boost converters, according to an aspect of the invention.

The system 300 includes the AC power source 102, the filter 104, the first boost converter 106, the isolated DC-DC converter 110, the battery 112, the second boost converter 114, the inverter 118, and the motor/generator 120 of FIG. 1, each as described herein.

The first boost converter 106 at least includes two capacitors 350A-350B, an inductor 352A, and two power switches 354A-354B. The isolated DC-DC converter 110 at least includes eight power switches 354C-354J, a transformer 356, and a capacitor 350C. The second boost converter 114 also at least includes two capacitors 350D-350E, an inductor 352B, and two power switches 354K-354L, similar to the first boost converter 106. The inverter 118 at least includes six power switches 354M-354R. In total, the system 300 includes five capacitors 350A-350E, two inductors 352A-352B, and eighteen power switches 354A-354R.

Figure 4:
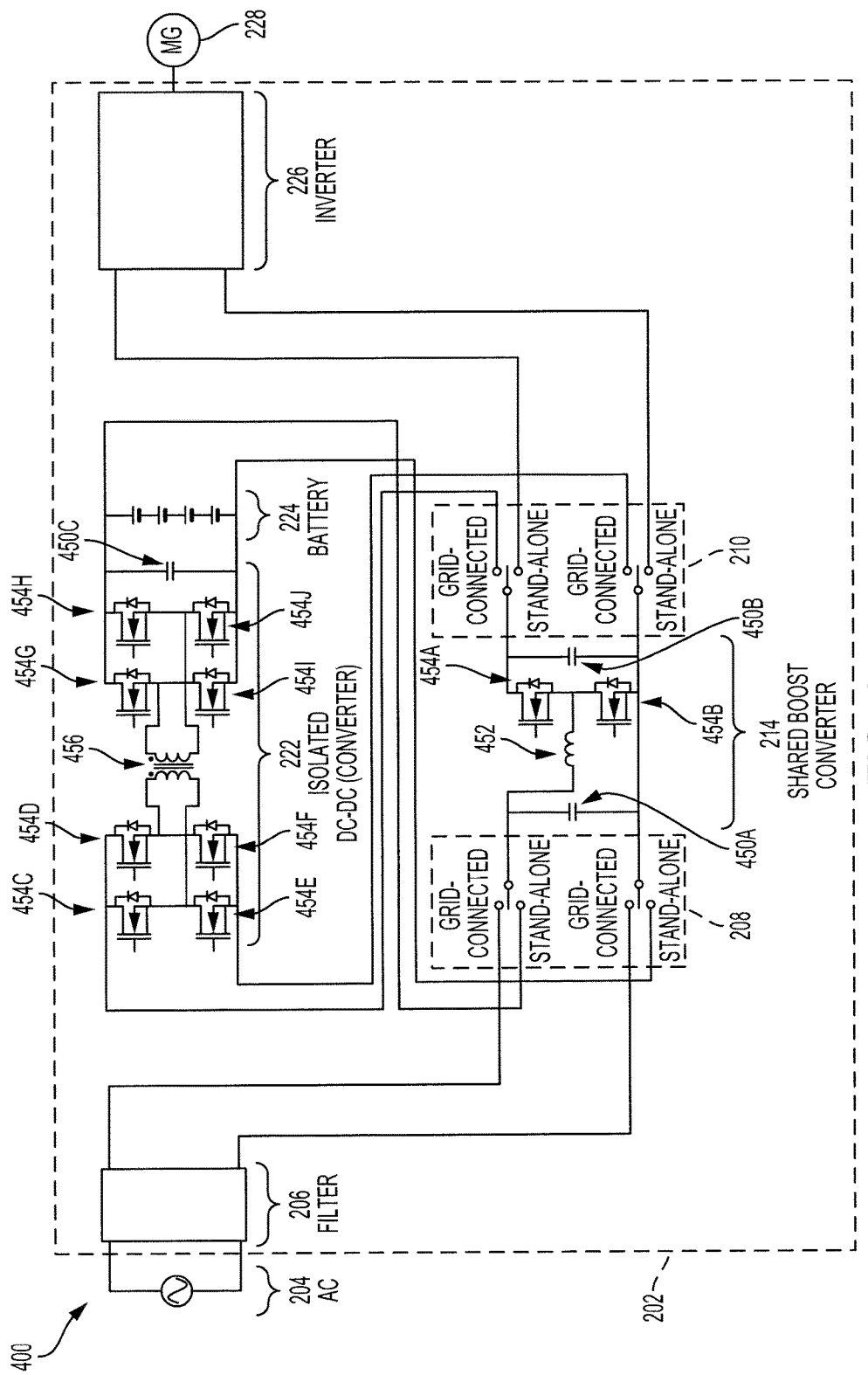
FIG. 4 is a circuit diagram of the example power conversion system of FIG. 2A, using a single shared boost converter, according to an aspect of the invention.

FIG. 4 is a circuit diagram of the example power conversion system of FIG. 2, using a single shared boost converter, according to an aspect of the invention.

The system 400 includes the AC power source 204, the filter 206, the first switch 208, the second switch 210, the shared boost converter 214, the isolated DC-DC converter 222, the battery 224, the inverter 226, and the motor/generator 228 of FIG. 2, each as described herein.

The shared boost converter 214 at least includes two capacitors 450A-450B, an inductor 452, and two power switches 454A-454B. The isolated DC-DC converter 222 at least includes eight power switches 454C-454J, a transformer 456, and a capacitor 450C. The inverter 226, in some embodiments, includes six power switches. In total, the system 400 includes three capacitors 450A-450C, one inductor 452, and as many as sixteen power switches. System 400 also includes four switches—two in each of the first switch 208 and the second switch 210. These switches may not require high-frequency or complex control and may have negligible on-state resistance.

As compared to the system 300 with separate boost converters, the system 400 with the shared boost converter 214 has fewer components (two capacitors, one inductor, and two power switches). In addition to the reduction of the capacitors, the inductor, and the power switches, fewer cooling systems may be needed or used when the shared boost converter 214 is used. As shown in FIG. 1, when two separate boost converters are used, two separate cooling units are also used. As shown in FIG. 2A, when a shared boost converter is used, a single cooling unit may be used. Having fewer components may result in savings in at least weight and cost. The reduced weight may improve efficiency, performance, and reliability of the system, and may ultimately improve driving range.

In addition to reduced weight and cost, cooling efficiency may be improved by using a more efficient single cooling system instead of two less efficient cooling systems. For example, referring to FIG. 1, the first cooling unit 126 (coupled to the first boost converter 106 and used when the electric vehicle 101 is charging) may use air cooling, and the second cooling unit 130 (coupled to the second boost converter 114 and used when the electric vehicle 101 is discharging) may use liquid (e.g., single-phase or two-phase boiling) cooling. A cooling unit using liquid cooling may be more efficient and more compact than a cooling unit using air cooling. The first cooling unit 126 may use air cooling due to cost and other constraints. However, when the shared boost converter is used, only one cooling unit is used, so the shared boost converter cooling unit 234 of FIG. 2A may use liquid cooling. In doing so, when the electric vehicle is charging, the shared boost converter 214 is able to use a more efficient cooling unit than the first boost converter 106. As the cooling of the shared boost converter is made more efficient, less energy may be lost during charging of the battery 224. In addition, the system may be more reliable, as fewer different component elements are involved.

The shared boost converter 214 may be thermally coupled to an existing, high-performance cooling system, such as a power control unit cooling system. In particular, one or more capacitors 450A-450B of the shared boost converter 214 may be temperature sensitive electrolytic capacitors coupled to the power control unit cooling system. In some embodiments, the capacitor 450B of the shared boost converter 214 is an electrolytic capacitor, and is thermally coupled to the power control unit cooling system. In some embodiments, other components, such as inductors, may be thermally coupled to the power control unit cooling system.

While the systems described herein are in the context of power systems for an electric vehicle, any system of the electric vehicle which has redundant elements and two or more mutually exclusive modes may be made more efficient by combining the redundant elements into a single shared element. Generally speaking, the more complex the redundant components are, the greater the gains are in combining them, as the redundant components are eliminated. Redundant converters which may be combined into a single shared converter may include buck, buck-boost, forward, flyback, half-bridge, full-bridge (dual active bridge), or LLC converters. Further, while the systems described herein illustrate a motor/generator being powered by the battery, any electrical component of the electric vehicle may ultimately be powered by the energy stored in the battery.

In an example embodiment, the shared boost converter 214 of FIG. 2A may be generally replaced with a shared converter (e.g., a buck converter) and the shared converter may be configured to adjust (e.g., step-down) the voltage and/or convert AC to DC. In addition, the motor/generator 228 and drivetrain 230 may be replaced with an electrical component of the electric vehicle corresponding to the system using the shared converter.

Exemplary embodiments of the methods/systems have been disclosed in an illustrative style. Accordingly, the terminology employed throughout should be read in a non-limiting manner. Although minor modifications to, the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A power system for an electric vehicle in a grid-connected mode or in a stand-alone mode, the power system comprising:
   a battery control unit configured to be in the grid-connected mode or the stand-alone mode based on operation of the electric vehicle;
   a shared boost converter connected to a battery, the shared boost converter configured to:
      receive power from an alternating current (AC) power source, step up voltage and convert the received AC power to direct current (DC) power, and output converted and stepped up DC power for storage in the battery when the battery control unit is in the grid-connected mode,
      receive DC power from the battery, step up voltage of the received DC power, and output stepped up DC power when the battery control unit is in the stand-alone mode, and
      receive generated DC power, step down voltage of the generated DC power, and output the stepped down DC power for storage in the battery when the battery control unit is in the stand-alone mode;
   an inverter connected to the shared boost converter and configured to receive the stepped up DC power from the shared boost converter when the battery control unit is in the stand-alone mode, convert the received stepped up DC power to AC power, and output converted AC power; and
   a motor/generator connected to the inverter and configured to receive the converted AC power for powering a drivetrain of the electric vehicle.

2. The power system of claim 1, further comprising a first switch and a second switch each having a first state and a second state, and being connected to the battery control unit, the first switch located between the AC power source and the shared boost converter, and the second switch located between the shared boost converter and the battery,
   wherein the first switch and the second switch are each set to the first state when the battery control unit is in the grid-connected mode, such that the shared boost converter connects the AC power source and the battery, and
   wherein the first switch and the second switch are each set to the second state when the battery control unit is in the stand-alone mode, such that the shared boost converter connects the battery and the inverter.

3. The power system of claim 1, further comprising a boost converter control unit connected to the shared boost converter and configured to implement a first control algorithm when the battery control unit is in the grid-connected mode, and a second control algorithm when the battery control unit is in the stand-alone mode, the first control algorithm causing the shared boost converter to step up voltage and convert the AC power received from the AC power source to DC power, and the second control algorithm causing the shared boost converter to step up voltage of the received DC power from the battery.

4. The power system of claim 1, further comprising an isolated DC-DC converter connected to the shared boost converter and the battery, and configured to, when the battery control unit is in the grid-connected mode, receive the converted and stepped up DC power from the shared boost converter, and refine the received DC power for storage in the battery.

5. The power system of claim 1, further comprising a filter connected to the AC power source and the shared boost converter, the filter configured to filter received AC power to comply with electromagnetic interference and/or electromagnetic compatibility requirements.

6. The power system of claim 1, wherein the shared boost converter is further configured to receive stored DC power from the battery, step down voltage and convert the received stored DC power into AC power, and outputting the stepped down and converted AC power for providing to the AC power source when the battery control unit is in the grid-connected mode.

7. The power system of claim 1, wherein the grid-connected mode and the stand-alone mode are mutually exclusive modes.

8. The power system of claim 1, wherein the shared boost converter is coupled to a liquid cooling structure of a power control unit of the electric vehicle, for cooling the shared boost converter.

9. A power system for an electric vehicle, the power system comprising:
   a battery control unit configured to be in a grid-connected mode or a stand-alone mode based on operation of the electric vehicle; and
   a shared boost converter connected to a battery, the shared boost converter configured to:
      facilitate charging of the battery when the battery control unit is in the grid-connected mode by receiving power from an alternating current (AC) power source, stepping up voltage and converting the received AC power to direct current (DC) power, and outputting converted and stepped up DC power for storage in the battery,
      facilitate charging of the battery when the battery control unit is in the stand-alone mode by receiving generated DC power, stepping down voltage of the generated DC power, and outputting the stepped down DC power for storage in the battery,
      facilitate discharging of the battery when the battery control unit is in the grid-connected mode by receiving stored DC power from the battery, stepping down voltage and converting the received stored DC power into AC power, and outputting the stepped down and converted AC power for providing to the AC power source, and
      facilitate discharging of the battery when the battery control unit is in the stand-alone mode by receiving DC power from the battery, stepping up voltage of the received DC power, and outputting stepped up DC power for powering a motor/generator of the electric vehicle.

10. The power system of claim 9, further comprising an inverter connected to the shared boost converter and configured to:
   receive the stepped up DC power from the shared boost converter and convert the received stepped up DC power to AC power when the shared boost converter facilitates discharge of the battery and the battery control unit is in the stand-alone mode; and
   receive generated AC power from the motor/generator and convert the generated AC power to the generated DC power when the shared boost converter facilitates charging of the battery and the battery control unit is in the stand-alone mode.

11. The power system of claim 9, further comprising a first switch and a second switch each having a first state and a second state, and being connected to the battery control unit, the first switch located between the AC power source and the shared boost converter, and the second switch located between the shared boost converter and the battery,
   wherein the first switch and the second switch are each set to the first state when the battery control unit is in the grid-connected mode, such that the shared boost converter connects the AC power source and the battery, and
   wherein the first switch and the second switch are each set to the second state when the battery control unit is in the stand-alone mode, such that the shared boost converter connects the battery and the motor/generator.

12. The power system of claim 9, further comprising a boost converter control unit connected to the shared boost converter and configured to implement a first control algorithm when the battery control unit is in the grid-connected mode, and a second control algorithm when the battery control unit is in the stand-alone mode.

13. The power system of claim 9, further comprising an isolated DC-DC converter connected to the shared boost converter and the battery, and configured to receive DC power and refine the received DC power.

14. The power system of claim 9, further comprising a filter connected to the AC power source and the shared boost converter, the filter configured to filter received AC power to comply with electromagnetic interference and/or electromagnetic compatibility requirements.

15. The power system of claim 9, wherein the shared boost converter is coupled to a liquid cooling structure of a power control unit of the electric vehicle, for cooling the shared boost converter.

16. An electric vehicle connected to an AC power source in a grid-connected mode and disconnected from the AC power source in a stand-alone mode, the electric vehicle comprising:
   a battery control unit configured to be in the grid-connected mode or the stand-alone mode;
   a shared boost converter configured to:
      step up voltage or step down voltage, and convert AC power to DC power or convert DC power to AC power when the battery control unit is in the grid-connected mode, and
      step up voltage or step down voltage when the battery control unit is in the stand-alone mode;
   an inverter coupled to the shared boost converter and configured to convert AC power to DC power or convert DC power to AC power when the battery control unit is in the stand-alone mode;
   a first switch and a second switch each having a first state and a second state, and each being connected to the battery control unit, the first switch located between the AC power source and the shared boost converter, and the second switch located between the shared boost converter and the battery, the first switch and the second switch each being set to the first state when the battery control unit is in the grid-connected mode such that the shared boost converter connects the AC power source and the battery, and the first switch and the second switch each being set to the second state when the battery control unit is in the stand-alone mode such that the shared boost converter connects the battery and the inverter; and a motor/generator connected to the inverter and configured to receive AC power from the battery via the inverter for powering a drivetrain of the electric vehicle or generate AC power for charging the battery.

17. The electric vehicle of claim 16, further comprising a boost converter control unit connected to the shared boost converter and configured to implement a first control algorithm when the battery control unit is in the grid-connected mode, and a second control algorithm when the battery control unit is in the stand-alone mode.

18. The electric vehicle of claim 16, wherein the shared boost converter is coupled to a liquid cooling structure of a power control unit, for cooling the shared boost converter.

* * * * *